Sept. 24, 1963  W. R. KOCAY ETAL  3,104,938
PROCESS OF PRODUCING SHAPED STRUCTURES FROM
AN ACRYLONITRILE POLYMERIZATION PRODUCT
Filed Dec. 18, 1961
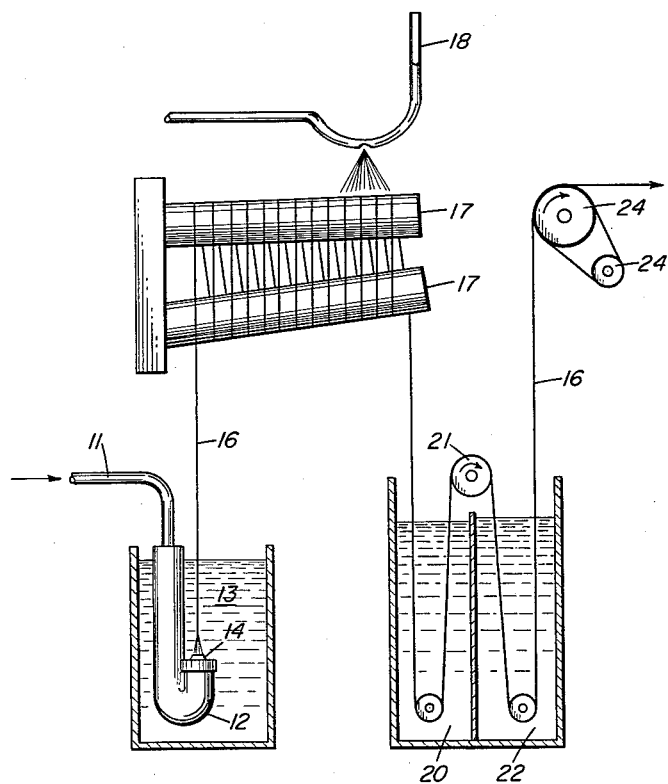
INVENTORS.
WITOLD R. KOCAY
JACK W. PREECE
BY
*Philip Mintz*
ATTORNEY

United States Patent Office 3,104,938
Patented Sept. 24, 1963

3,104,938
PROCESS OF PRODUCING SHAPED STRUCTURES FROM AN ACRYLONITRILE POLYMERIZATION PRODUCT
Witold Roman Kocay, Stamford, and Jack Wherry Preece, Glenbrook, Conn., assignors to American Cyanamid Company, New York, N.Y., a corporation of Maine
Filed Dec. 18, 1961, Ser. No. 160,198
6 Claims. (Cl. 18—54)

This invention relates to certain new and useful improvements in the art of producing shaped articles or structures, e.g., films, ribbons, tapes, filaments, etc., from organic materials, and, more particularly, for producing shaped articles from polymeric materials, such as, for example, an acrylonitrile polymerization product. In a presently preferred form, this invention relates to improvement for continuously spinning endless filaments of acrylonitrile polymers.

Various processes for preparing shaped articles from acrylonitrile polymers are known and described in the literature. In these processes, acrylonitrile polymers are dissolved in a suitable solvent, extruded through a spinnerette into a coagulating medium to form the shaped articles, and the shaped articles are then subjected to further treatment to improve and modify various properties. Among these after-treatments, useful improvements in the properties of the finished acrylonitrile polymer structure can be produced by stretching the freshly formed acrylonitrile polymer structure.

In Creswell, U.S. Patent No. 2,558,730, issued July 3, 1951, it is taught that useful films, filaments, threads and other shaped articles, can be produced from acrylonitrile polymerization products of the kind described therein and in the patents mentioned therein, by coagulating the polymerization product in approximately its desired shape from a solution thereof, more particularly, a concentrated aqueous salt solution of the kind disclosed by Rein in U.S. Patent No. 2,140,921, the coagulation being effected by contacting the said solution with a cold aqueous coagulant at a temperature not substantially exceeding +10° C. This freshly formed gelled structure is then stretched to at least twice its original length in an aqueous bath maintained at a temperature of from about 70° C. to about 110° C. to orient the molecules along the fiber axis and produce a product having increased tensile strength, toughness, resilience, and other improved properties. The present invention is an improvement on the process disclosed in the aforesaid Cresswell U.S. Patent No. 2,558,730.

In Cummings U.S. Patent No. 2,948,581, issued August 9, 1960, it is taught that useful filaments, threads, etc., can be produced from acrylonitrile polymerization products of the kind described therein by coagulating the polymerization product in approximately its desired shape from a solution thereof, more particularly, a concentrated aqueous salt solution of a thiocyanate, the coagulation being effected by contacting the said solution with a cold aqueous coagulant at a temperature at or below +10° C. This freshly formed gel structure, containing also an alkali-metal thiocyanate in an amount corresponding to, on net-dry basis, from one-half to twice the weight of the net-dry acrylonitrile polymer that is present in the freshly formed gel structure, is stretched through air at approximately the temperature at which it was formed. After stretching, the gelled structure is washed to substantially remove the thiocyanate salt therefrom, and is then additionally stretched in an aqueous bath maintained at about 70° C. to about 110° C. The present invention is likewise an improvement on the process disclosed and claimed in the aforesaid Cummings U.S. Patent No. 2,948,581.

The present invention is based on our discovery that several useful advantages and further improvements in the product produced can be achieved by performing the step of stretching or elongating the said gel structure of acrylonitrile polymer in a plurality of stages of sequentially increasing temperature, the first of which is at a temperature appreciably above the temperature at which the gel structure had been formed, which advantages are fully realizable when the freshly formed gel structure is washed substantially free of contaminating impurities prior to the plural stages of stretching.

For a greater understanding of this invention, reference may be had to the subjoined description read in conjunction with the accompanying drawing, the sole FIGURE of which is a schematic illustration of the several steps involved in the method of the invention as utilized in the formation of shaped articles in the form of filaments and indicative of apparatus that can be used in practicing the method.

A spinning solution comprising an acrylonitrile polymerization product dissolved in a suitable solvent is introduced through conduit 11 to spinning device 12 immersed in a coagulating bath 13. The spinning solution, after extrusion through the orifices in spinnerette 14 of spinning device 12, is coagulated by coagulating bath 13 to form a wet gel structure, such as continuous filaments 16, which is drawn upwardly around thread-advancing rolls 17. On thread-advancing rolls 17, gel filaments 16 are advanced to the right as seen in the figure while being washed with cold aqueous liquid from wash tube 18. From thread-advancing rolls 17, the washed gel filaments 16 are passed downwardly into and through heated liquid baths 20 and 22 where they are stretched in a plurality of stages at sequentially increasing temperatures, the proportion of the total stretch accomplished in each stage being controlled by power-driven roll 21. From the last and hottest liquid stretch bath 22, wet gel filaments 16 are drawn upwardly to tension-applying rolls 24 which may be thread-advancing rolls and from which filaments 16 are delivered for such further processing as may be desired.

To provide a clearer understanding of this invention, and the objects and advantages thereof, a presently preferred embodiment of the invention will now be described to illustrate this invention in greater detail.

It is to be expressly understood, however, that the following details are to be considered as illustrative only and not as limitations upon the invention. The invention itself is as defined in the subjoined claims and is not to be construed as limited except by the limitations contained in the claims themselves.

This invention was particularly developed for the spinning of solutions of acrylonitrile polymers in a suitable solvent. Many such spinning solutions containing acrylonitrile polymerization products are known and are useful for this invention. Typical of such polymers and solvents are those disclosed in Cummings U.S.

Patent No. 2,948,581, dated August 9, 1960, and the various other U.S. Patents mentioned therein.

Representative compounds which may be polymerized with acrylonitrile to form acrylonitrile polymerization products useful for the practice of this invention are compounds containing a single $CH_2=C<$ grouping, for instance, the vinyl esters and especially the vinyl esters of saturated aliphatic monocarboxylic acids, e.g., vinyl acetate, vinyl propionate, vinyl butyrate, etc.; vinyl and vinylidene halides, e.g., the vinyl and vinylidene chlorides, bromides and fluorides; allyl-type alcohols, e.g., allyl alcohol, methallyl alcohol, ethallyl alcohol, etc.; allyl, methallyl and other unsaturated monohydric alcohol esters of monobasic acids, e.g., allyl and methallyl acetates, laurates, cyanides, etc.; acrylic and alkacrylic acids (e.g., methacrylic, ethacrylic, etc.) and esters and amides of such acids (e.g., methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; unsaturated aliphatic hydrocarbons containing a single $CH_2=C<$ grouping, e.g., isobutylene, etc.; and numerous other vinyl, acrylic and other compounds containing a single $CH_2=C<$ grouping which are copolymerizable with acrylonitrile to yield thermoplastic copolymers. Alkyl esters of alpha, beta-unsaturated polycarboxylic acids also may be copolymerized with acrylonitrile to form copolymers, e.g., the dimethyl, -ethyl, -propyl, -butyl, etc., esters of maleic, fumaric, citraconic, etc., acids.

Ordinarily, the molecular weight (average molecular weight) of the homopolymeric or copolymeric acrylonitrile, from which the polyacrylonitrile shaped articles are made, it within the range of 25,000 or 30,000 to 200,000 or 300,000 or higher, and advantageously is of the order of 50,000 to 100,000, e.g., about 70,000–80,000, as calculated from a viscosity measurement of the said polymerization product in dimethyl formamide using the Staudinger equation (reference: Houtz U.S. Patent No. 2,404,713, dated July 23, 1946). While it is preferred to have the polymer molecule contain at least 80% combined acrylonitrile, it is to be understood that polymers containing less than this amount of acrylonitrile may also be useful for the practice of this invention.

Representative solvents into which such acrylonitrile polymers may be dissolved are organic solvents such as dimethyl formamide, dimethyl acetamide, ethylene carbonate, and dimethyl sulfoxide and inorganic solvents such as concentrated aqueous solutions of inorganic salts, e.g., sodium thiocyanate, zinc chloride.

Preferably, such spinning solutions comprise acrylonitrile polymers dissolved in concentrated aqueous solutions of inorganic salts such as disclosed in Rein U.S. Patent No. 2,140,921, dated December 20, 1938, and in Cresswell U.S. Patent No. 2,558,730, dated July 3, 1951. Specifically, the process of this invention has been performed utilizing a polymer comprising at least about 80% combined acrylonitrile, copolymerized with one or more of the following: methyl acrylate, vinyl acetate, methyl methacrylate, methyl vinyl pyridine. The spinning solution used comprised about 10% of such polymer, about 45% sodium thiocyanate, and about 45% water.

The polymeric solution introduced through conduit 11 passes through a heated insulated spinning device 12 (such as is described and claimed in Kocay U.S. Patent No. 2,821,743, dated February 4, 1958) where it is maintained at a temperature above that of the coagulating bath 13, e.g., at approximately 25° C. to 100° C. The polymeric solution is extruded through the orifices of spinnerette 14 into a cold coagulating bath comprising mainly water maintained at a temperature in the range of —15° C. to +10° C. as described and claimed in Cresswell U.S. Patent No. 2,558,730, dated July 3, 1951. More specifically the process of this invention has been performed using a coagulating bath 13 comprising about 10% sodium thiocyanate and 90% water maintained at about 0° C.

From coagulating bath 13, the wet gel filaments 16 pass to thread-advancing roll 17 where they are washed with a cold aqueous liquid to substantially free them of salt as taught in Cresswell U.S. Patent No. 2,558,731, dated July 3, 1951. Thread-advancing rolls 17 and wash tube 18 may be of the type claimed and described in Kocay et al. U.S. Patent No. 2,885,878, dated May 12, 1959. Preferably the cold liquid is water or a dilute aqueous solution of salt such as sodium thiocyanate maintained at a temperature below about 20° C. However, if necessary or desirable, ammonia may be added to the wash water to assist it in freeing the wet gel structure of salts as taught in Cresswell U.S. Patent No. 2,916,348, dated December 8, 1959.

From thread-advancing rolls 17, the washed salt-free wet gel filaments 16 are passed downwardly through two heated liquid baths 20 and 22 where they are stretched to improve the properties of the thread. Between baths 20 and 22, power-driven roll 21 serves to proportion the total stretch imparted to the thread 16 between the two heated baths 20 and 22. A total stretch to about five to thirteen times the unstretched length, and preferably about seven to nine times, may be achieved in the two baths by providing a stretch of about one and one-third times to about seven times, and preferably about one and one-half to about four times in bath 20 comprising water maintained at about 40° C. to about 90° C., and preferably about 60° C. to about 70° C. with the remainder of the stretch being provided in bath 22 comprising water maintained at about 95° C. to 100° C., and preferably about 99° C. Depending upon properties desired, other amounts of total stretch may be used. Cresswell U.S. Patent No. 2,558,730, dated July 31, 1951, teaches many of the advantages of stretching a wet gel structure in a heated aqueous medium.

However, it has been found that additional advantages accrue from performing the stretch in two stages as described above wherein the first stage is performed in a heated aqueous medium maintained at a relatively lower temperature and the remainder of the stretch is performed in a second stage maintained at a relatively higher temperature. By subdividing the stretch of the wet gel structure of an acrylonitrile polymerization product into two or more stages of sequentially increasing temperatures, a higher total stretch can be achieved than if only a single stage of stretching is used. Also, the use of a plurality of heated stretching baths of sequentially increasing temperatures reduces the thermal shock to the delicate gel structure (which preferably comes from the wash rolls 17 at a temperature of less than about 20° C.) while permitting the final stage of stretching to be performed in an aqueous bath approximately at its boiling point.

Further, because the hot aqueous stretch baths also perform the function of partially dehydrating the gel in the present process, using a plurality of baths of sequentially increasing temperature permits the dehydration of the fibers from a water-to-polymer ratio of about 10:1 to a ratio of about 2:1 to 1:1 to occur more uniformly and with less shock to the delicate gel structure entering the hot stretch bath. It has been found that the performance of the stretch in a plurality of baths of sequentially increasing temperature permits the attainment of a higher degree of dehydration than is possible utilizing a single stage of stretch, other conditions being maintained constant. This attainment of a higher degree of dehydration is very important because of its advantageous effects upon subsequent dehydration steps. More highly dehydrated wet gel structures can be dried or dehydrated further and collapsed with the utilization of less energy consumption and lower temperatures thereby producing better physical properties and more uniformity in the final product than can be produced starting from more highly hydrated wet gel structures. Since more highly dehydrated wet gel structures can be collapsed at lower temperatures and, therefore, at a lower rate of removal of moisture per unit time, the filament cross-section shape is more nearly round and less crenulated as compared with dehydrated collapsed structures produced from more highly hydrated wet gel structures.

For these advantages to be fully realized, it is important that the wet gel structure entering the first stretch bath be washed substantially free of the salts previously utilized to make the polymer soluble in the spinning solution and of the salts present in the coagulating bath 13 prior to being subjected to the heat and tensile forces required for stretching. By "substantially free of salts" is meant that the salt content of the wet gel structure is reduced to a level (e.g., less than 1% salt on a wet gel basis) such that the remaining salt content does not interfere with the attainment of the objectives of the wet-stretching operation as outlined above.

Available evidence seems to indicate that the superior results attained by the performance of the stretching operation in a plurality of aqueous baths of sequentially increasing temperature arise from differences between the optimum temperature for the dehydration of the wet gel structure and the optimum temperature for the elongation of the fiber. It, therefore, would be impossible to optimize both conditions in a single heated aqueous bath. By providing a plurality of aqueous baths of sequentially increasing temperatures, the conditions for each of the functions of the stretch baths may be optimized.

From hot aqueous bath 22, the wet stretched gel filaments 16 advance upwardly to power-driven tension-applying rolls 24 which may be thread-advancing rolls of a type conventional in the art. Utilizing the process conditions previously defined, it has been found that it is possible to operate rolls 24 at peripheral speeds in excess of 350 meters per minute and even up to as much as 600 meters per minute. At these high speeds of production, it is important that the wet gel structure, which is very tender and fragile, be handled as little as possible and at as low speed as possible. By performing the step of washing the gel structure substantially free of contaminants prior to stretching such filaments, the washing operation will be performed at relatively the lowest speed at which the filaments move. This greatly eases the operating problem involved in threading up a very high speed machine, particularly when the washing is performed on a pair of thread-advancing rolls.

Optionally, tension-producing rolls may be heated thread-advancing rolls, such as shown in Forzley et al. U.S. Patent No. 2,622,182, issued December 16, 1952, or Bundegaard et al. U.S. Patent No. 2,777,931, issued January 15, 1957, for the additional purpose of dehydrating the gel and collapsing the polymer structure prior to the subsequent treatment or collection of the thus-produced shaped article. Where the tension-producing rolls 24 also serve the function of dehydrating and collapsing the polymer structure, it may be desirable to precede such rolls with means for stripping excess liquid from filament 16 and with means for applying lubricants and/or antistatic agents to such filaments prior to tension-producing rolls 24.

While this invention has been described as applied to a "wet-spinning" process wherein the coagulating medium is a liquid, this invention is also useful in "dry-spinning" wherein a solution of the polymer in a volatile solvent is extruded into a gaseous coagulating medium into which solvent can evaporate to produce a shaped article having an uncollapsed structure which is here called a "gel structure." In such case, the freshly formed gel structure is next washed to substantially free it of solvent, and is then subsequently elongated in a plurality of baths of sequentially increasing temperatures.

Also, while the invention has been described above in connection with specific embodiments utilizing two heated aqueous stretch baths, it is to be understood that if found necessary or desirable with other acrylonitrile polymers, three or more heated aqueous stretch baths of sequentially increasing temperatures, may be used. Also, while specific apparatus has been indicated as useful for the performance of the method of this invention, other devices, known in the art, may be substituted for those illustrated and described so long as the essential functions of this invention, as defined in the subjoined claims, are performed.

We claim:
1. A process of producing shaped structures from an acrylonitrile polymerization product comprising extruding a spinning solution thereof into a coagulating medium; washing the thus freshly formed gel structure substantially free of contaminating impurities; irreversibly stretching the thus washed wet gel structure in a first aqueous bath maintained at a temperature of about 40° C. to about 90° C.; and further irreversibly stretching the thus stretched wet gel structure in a second aqueous bath maintained at a temperature of about 95° C. to about 100° C.

2. A process as defined in claim 1 wherein said washed wet gel structure is stretched to about 5 to 13 times the unstretched length, the stretching in said first aqueous bath being about 1⅓ times to about 7 times and the remainder of said stretch being produced in said second aqueous bath.

3. In the process of producing shaped structures from an acrylonitrile polymerization product by the extrusion of a spinning solution thereof in an aqueous salt solution, elongating the wet gel structure thus produced, and subsequently dehydrating said structure, the improvement comprising:
   washing said freshly formed wet gel structure substantially free of said salt;
   irreversibly stretching said substantially salt-free wet gel structure in a first aqueous bath maintained at a temperature of about 40° C. to about 90° C.; and further irreversibly stretching said substantially salt-free wet gel structure in a second aqueous bath maintained at a temperature of about 95° C. to about 100° C.

4. A process as defined in claim 3 wherein said shaped structure is elongated about one and one-third to about seven times in said first bath and is further elongated in said second bath to produce a total elongation of about five to about thirteen times.

5. A process for producing shaped structures from an acrylonitrile polymerization product comprising extruding an equeous thiocyanate spinning solution thereof into an aqueous coagulating medium maintained at a temperature below +10° C.; washing the thus freshly formed gel structure substantially free of thiocyamate with an aqueous medium maintained at a temperature below about 20° C.; stretching the wet gel structure to about 1⅓ times to about 7 times its unstretched length in a first aqueous bath maintained between about 40° C. and about 90° C.; and further stretching the thus stretched wet gel structure to a total of about 5 times to about 13 times the unstretched length in a second aqueous bath maintained at a temperature of about 95° C. to about 100° C.

6. A process for producing shaped structures from an acrylonitrile polymerization product comprising extruding an equeous thiocyanate spinning solution thereof into an aqueous coagulating medium maintained at a temperature below +10° C.; washing the thus freshly formed wet gel structure substantially free of thiocyanate with an aqueous medium maintained at a temperature below about 20° C.; stretching the wet gel structure to about 1½ times to about 4 times its unstretched length in a first aqueous bath maintained between about 60° C. and about 70° C.; and further stretching the thus stretched wet gel structure to a total of about 7 times to about 9 times the unstretched length in a second aqueous bath maintained at about 99° C.

References Cited in the file of this patent

UNITED STATES PATENTS

| | | |
|---|---|---|
| 2,558,731 | Cresswell | July 3, 1951 |
| 2,918,346 | Paulsen | Dec. 22, 1959 |
| 2,957,748 | Lieseberg | Oct. 25, 1960 |
| 2,988,783 | Miller et al. | June 20, 1961 |